UNITED STATES PATENT OFFICE.

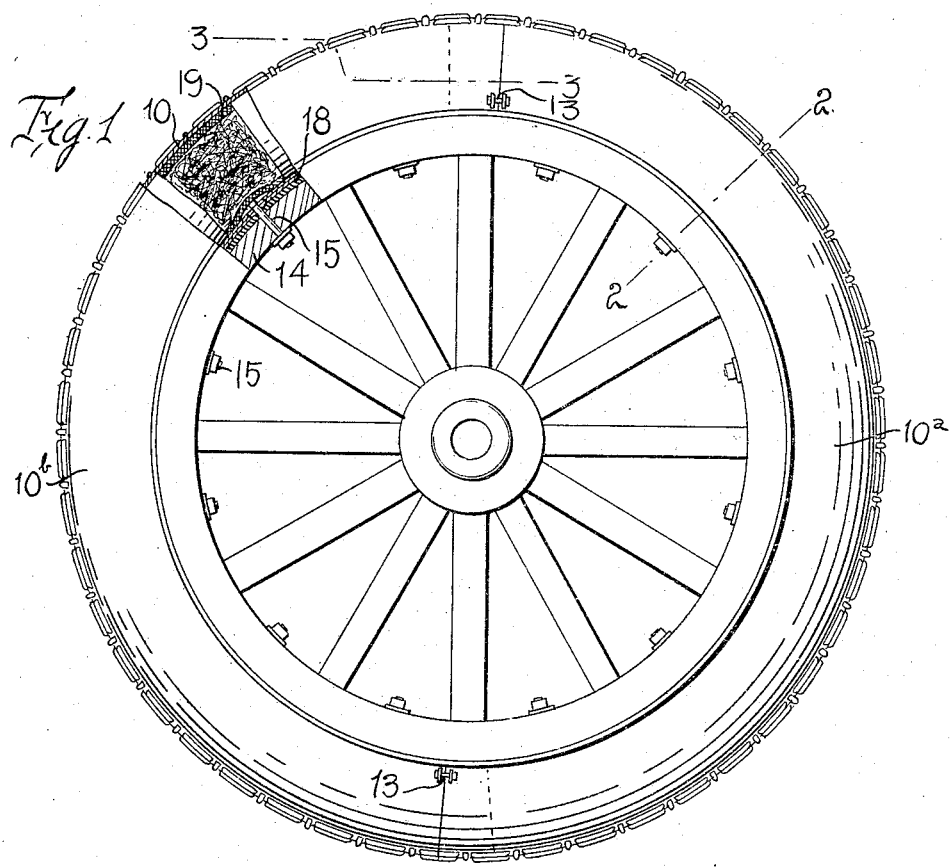
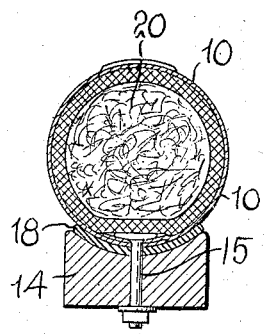
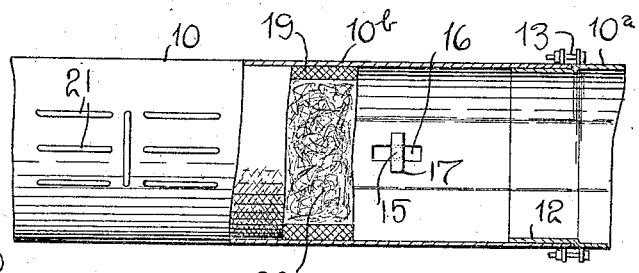

CASON F. ADAMS, OF PAVO, GEORGIA.

CUSHION-TIRE.

1,200,291.   Specification of Letters Patent.   Patented Oct. 3, 1916.

Application filed February 14, 1916. Serial No. 78,306.

*To all whom it may concern:*

Be it known, that I, CASON F. ADAMS, a citizen of the United States, residing at Pavo, in the county of Thomas and State of Georgia, have invented certain new and useful Improvements in Cushion-Tires, of which the following is a specification, reference being had to the accompanying drawings.

This invention relates to vehicle wheels, and particularly to the tire construction thereof.

The general object of the invention is the provision of a very simple tire, so constructed that it will take the place of the rubber pneumatic tire now in use, and further so constructed as to resist punctures.

Still another object of the invention is the provision of a very light tire, which, however, is sufficiently strong for the purpose indicated, which tire is made in sections so that it may be readily disposed upon or removed from a wheel, and further to provide means whereby the tire may be readily connected to the wheel.

Still another object of the invention is the provision of a tire made of thin metal and the provision of an inner tube, as it may be termed, of canvas or other suitable material, distended by being packed with material which is sufficiently resilient as to give a cushioning effect to the tire.

Other objects will appear in the course of the following description.

My invention is illustrated in the accompanying drawings, wherein:

Figure 1 is a side elevation of a tire constructed in accordance with my invention, partly in section; Fig. 2 is a transverse section on the line 2—2 of Fig. 1; Fig. 3 is a plan view partly in section.

Referring to these drawings it will be seen that my improved tire comprises an outer shell of metal, designated 10. This metal may be relatively thin and preferably is of steel. This outer shell 10 is made in a plurality of sections. I have illustrated it as made in two sections, designated 10ª and 10ᵇ, but I do not wish to be limited to this as it is obvious that a greater number or a fewer number of sections may be used. As shown in Fig. 3, one of the sections, as for instance the section 10ª, at one end is formed with an inwardly contracted extremity 12 which is adapted to be inserted within the adjacent extremity of the other section. The section 10ᵇ is of course also provided at one end with a contracted portion adapted to be inserted within the corresponding end of the next adjacent section. After these sections are mounted upon the wheel they may be bolted to each other by means of bolts 13 or screws adapted to be inserted through flanges on the ends of the sections and engage the sections together.

For the purpose of connecting the shell or outer tube 10 of the tire to the wheel rim 14, I provide a plurality of bolts 15 which are adapted to extend through the wheel rim 14 between the spokes of the wheel. As illustrated, the shell 10 at its base is formed with a plurality of longitudinally extending slots 16, and the bolts 15 have elongated heads 17 which may be inserted through said slots which when turned will bridge the slots as illustrated clearly in Figs. 2 and 3. In order to prevent any rattling and also in order to prevent water from seeping into the space between the rim 14 and the outer tube or casing 10, I preferably dispose a leather packing 18 between the rim and the casing, shell or outer tube 10, as shown clearly in Fig. 2. This packing may be made of any suitable material, though leather is preferably used. This packing also prevents the tube from wearing upon the rim 14.

Within the casing or outer tube 10 there is disposed an inner tube 19. This inner tube is preferably made of canvas or like material and is stuffed or distended by filling it with cotton, jute, or other fibrous and somewhat resiliently compressible material designated 20. As illustrated in Fig. 2, the edges of the metallic sheet which forms the outer tube or casing 10 are lapped and held together in their lapped relation by means of the bolts 15. Thus when the bolts are released from their engagement with the rim they may be readily withdrawn from their engagement with the overlapping margins of the casing 10 so that the casing may be opened and the inner tube taken out, replaced or repaired. It is obvious also that the metallic sheet 10 may be also formed with corrugations on its tread face, as at 21, these corrugations being of any suitable form and acting to prevent the tire from skidding. These corrugations, however, not only prevent the tire from skidding but they strengthen the outer casing.

It will be seen that my improved tire is very light, may be cheaply made, can be easily applied to wheels, and inasmuch as it is made in sections may be easily removed and replaced upon the wheel.

Having described the invention, what I claim is:

1. A tire comprising an outer shell of sheet metal bent to form a tube, an inner tube of thin flexible material and contacting with the inner face of the outer metallic shell, and a filling of resiliently compressible loosely arranged fibrous material holding the tube distended.

2. The combination with a wheel rim, of a tire supported upon the rim and comprising a metallic tubular casing formed of a plurality of sections, one end of one section fitting into the adjacent end of the other section and having telescopic engagement therewith, means for holding said sections in interfitting adjusted engagement with each other, and means detachably holding the sections to the wheel rim, said means being adapted to permit the adjustment of the sections with relation to each other and the wheel rim, and being adapted to lock the sections in adjusted position upon the wheel rim.

In testimony whereof I hereunto affix my signature in the presence of two witnesses.

CASON F. ADAMS.

Witnesses:
C. B. HOLTON,
J. W. ROGERS.

Copies of this patent may be obtained for five cents each, by addressing the "Commissioner of Patents, Washington, D. C."